United States Patent Office 2,841,467
Patented July 1, 1958

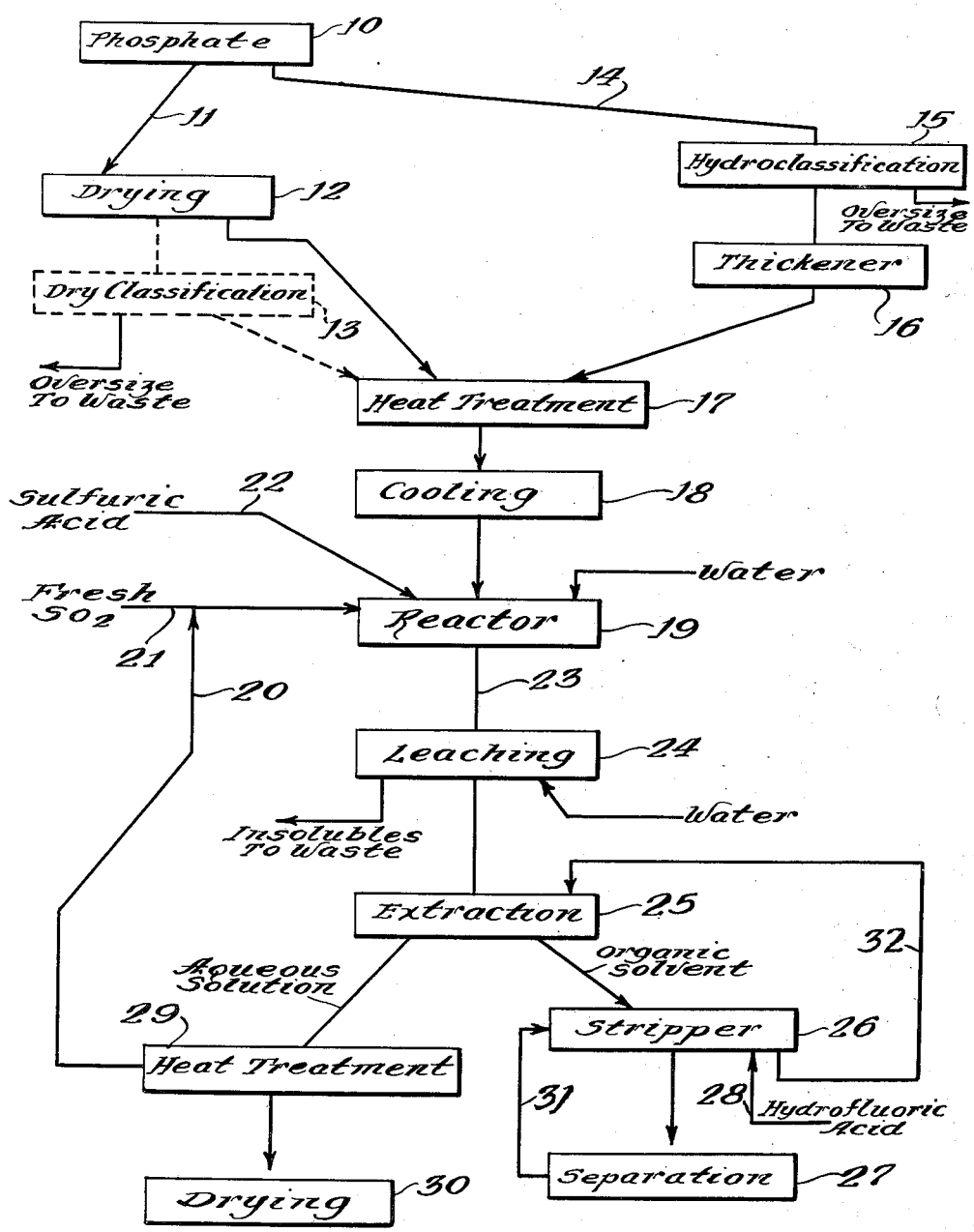

2,841,467

METHOD FOR RECOVERY OF MINERAL VALUES FROM LEACHED ZONE MATERIAL

Robert F. McCullough, Glenview, Ill., assignor, by mesne assignments, to the United States of America as represented by the United States Atomic Energy Commission Application January 18, 1955, Serial No. 482,448

7 Claims. (Cl. 23—14.5)

The process of the instant invention relates to the recovery of certain mineral values found in the so-called leached zone of the overburden found in the Florida pebble phosphate sands. More particularly it relates to the solubilizing of the mineral values so that one or more thereof may be individually recovered. Still more particularly it relates to a process for the recovery of uranium and phosphorus.

Strip mining removes the top cover from the phosphate beds. The uncovered layer is the leached zone or so-called Bartow clay. This leached zone material which is a clay-like material has been variously identified as containing wavellite, $Al_3(OH)_3P_2O_8.5H_2O$, or pseudo wavellite, $5CaO.6Al_2O_3.4P_2O_5.18H_2O$, or mixtures thereof found together with quartz sand, kaolinite, fluorapatite and millicite, a material markedly different from the underlying Florida phosphate pebble consisting predominantly of tricalcium phosphate, $Ca_3(PO_4)_2$. The leached zone material contains acid soluble and insoluble siliceous materials, as well as uranium, phosphorus, aluminum, calcium, iron and minor values.

Recovery of the uranium from the leached zone material has been effected in the past by solubilizing the mineral constituents by means of a mineral acid, such as sulfuric or nitric acids, removing the uranium from solution, and treating the resultant solution to produce a chemical fertilizer.

It is an object of this invention to provide a new and improved process for solubilizing the mineral constituents of leached zone whereby major quantities of mineral values may be recovered.

It is still another object of this invention to provide a process wherein a volatile agent is utilized for solubilizing the mineral values.

It is still another object of this invention to provide a process using a volatile agent, the excess quantities of which needed for reaction can be recovered thus lowering the cost of processing.

These and other objects of the invention will be apparent to those skilled in the art upon reading the following description.

In the process of the present invention the leached zone material is heat treated before reacting the leached zone material with the solubilizing agent. This heat treatment is necessary to accomplish significant solubilizing of the desired mineral values when utilizing the particular solubilizing agent. The ore to be processed, as mined, may be dried and calcined prior to solubilizing, but the preferable procedure is to size the ore, comminuting when necessary, to recover a small particle size fraction normally smaller than about 150 mesh or about 200 mesh standard screen size, depending upon the classification procedure in the ore dressing section of the plant. If the mined ore is to be classified, it may be transported from the mine to the processing plant either by dry or wet transportation systems. If transported dry, the leached zone material is further dried and then sized either by mechanical or air classification means to produce an undersized fraction of particles smaller than the aforesaid approximately 150 mesh size. If the mined material is moved hydraulically to the processing plant, the material is subjected to wet classification and the undersized fraction subjected to a thickening and filtering operation to produce a high solids content slurry of the order of about 30% to about 65% solids by weight. The solids of this slurry are subjected to heat treatment either directly or after a preliminary drying step.

The dry solids, whose particle size fraction is the more valuable portion of the leached zone material because it contains roughly 70% or better of the valuable minerals, will vary considerably in composition depending upon the area in which the ore is mined. Therefore, the following description is given with reference to a leached zone material of which the following would be a representative average assay.

| Mineral Value | Plus 200 Mesh | Minus 200 Mesh |
|---|---|---|
| $P_2O_5$ | 5.44 | 14.68 |
| $Al_2O_3$ | 1.68 | 25.34 |
| $CaO$ | 5.53 | 9.19 |
| $Fe_2O_3$ | 1.60 | 3.11 |
| $U_3O_8$ | 0.0053 | 0.03 |
| Acid Insoluble | 83.08 | 38.56 |
| Percent of Total Weight | 67 | 33 |

While the above shows the result of classification of a number of samples, for any one particular sample the percentages of various minerals are subject to considerable variation, i. e., $Al_2O_3$ varying from about 11% to about 35% in the —200 mesh fraction.

In general the process comprises reacting calcined leached zone material in slurry form with sulfur dioxide, adding an aqueous medium to the reacted slurry mixture, and treating the reaction products to recover one or more of the mineral values.

Solids, for example, from the classification and ore dressing operation may be heat treated or calcined under a wide range of temperature conditions depending upon the mineral composition, the time of heat treatment or the digestion conditions which it is desired to maintain. The solids may be subjected to temperatures between about 200° C. to about 1000° C. with the temperature preferably being maintained in the range of between about 500° C. to about 700° C. Heat treatment of the solids may be for periods of between about 20 minutes to about 6 hours depending upon the temperature, with a heat treatment of about 1 hour preferred when maintaining a temperature in the 500° C. to 700° C. range. Another factor determining the holding time is that for any set of digestion conditions in general the lower the calcination temperature, the longer the required period of heat treatment. The effect of heat treatment is illustrated by the following data which was obtained as follows: 6 equal weight portions of —200 mesh size leached zone material were heat treated at the listed temperatures for 1 hour. Each portion was then slurried to a 38% aqueous slurry and digested with $SO_2$ for four hours at room temperature and atmospheric pressure. The dissolution of $P_2O_5$ and $U_3O_8$ shows that maximum dissolution of these two components was attained at about 600° C.

| Calcination Temperatures, °C | Percent Dissolution | | Percent Weight Loss in Calcining |
|---|---|---|---|
| | $U_3O_8$ | $P_2O_5$ | |
| 200 | 4 | 22 | 5.6 |
| 300 | 4 | 29 | 8.7 |
| 400 | 10 | 36 | 10.6 |
| 500 | 44 | 56 | 13.2 |
| 600 | 77 | 66 | 16.1 |
| 700 | 71 | 48 | 16.0 |
| 800 | 45 | 40 | 16.5 |

Twenty-five minus 200 mesh leached zone specimens were heated one hour at 600° C. and reacted at 15% solids with sulfur dioxide for 4 hours at room temperature. These samples showed a range of dissolution for $U_3O_8$ between about 75% and about 92%, for $Al_2O_3$ between about 22% and about 57% and for $P_2O_5$ between about 59% and about 87%. Uncalcined leached zone samples from the same sources generally showed dissolutions about 50% less than these dissolutions. However, about 10% of the specimens showed dissolutions equivalent to the calcined material for one or more components.

Digestion of the heat treated leached zone material is carried out under such conditions of solids concentration in the slurry, amount of sulfur dioxide per unit of solid material, reaction time, reaction temperature and reaction pressure as to obtain optimum solubilizing of uranium, aluminum, phosphorus, and calcium, i. e., through the formation of reaction products soluble in aqueous media. Solids to be digested are converted to an aqueous slurry having solids content of between about 5% and about 50% by weight and preferably between about 15% and about 25% by weight. Slurries having solids contents in this range are heated to a desired temperature for reaction either before or during the reaction. The temperature of reaction ranges from between about 0° C. to about 75° C. with a temperature of between about 25° C. and about 35° C. preferred. Slurries are maintained at approximately these temperatures for reaction periods of between about one hour and about 24 hours. The reaction is preferably carried out under conditions for maximum solubilizing of mineral values during a period of between about 4 hours to about 6 hours.

The effect of digestion time upon dissolution was determined by calcining a —200 mesh size leached zone material at 600° C. for 1 hour. The heat treated solids were cooled to room temperature and mixed with water to produce a 30% solids content slurry. The slurry was held at a temperature maintained between about 25° C. and about 30° C. while bubbling sulfur dioxide through the slurry at atmospheric pressure. At the end of 2, 4, 6, and 24 hour periods, samples were withdrawn and centrifuged with the cake being repumped twice with water to leach out soluble values. Results were as follows:

| Digestion Time, Hours | Value | Percent Dissolution |
| --- | --- | --- |
| 2 | $U_3O_8$ | 40 |
| 2 | $Al_2O_3$ | 20 |
| 2 | $P_2O_5$ | 37 |
| 4 | $U_3O_8$ | 67 |
| 4 | $Al_2O_3$ | 25 |
| 4 | $P_2O_5$ | 58 |
| 6 | $U_3O_8$ | 76 |
| 6 | $Al_2O_3$ | 30 |
| 6 | $P_2O_5$ | 61 |
| 24 | $U_3O_8$ | 84 |
| 24 | $Al_2O_3$ | 34 |
| 24 | $P_2O_5$ | 66 |

Digestion of the solids is accomplished by the use of sulfur dioxide. The slurry is held in a container which can be maintained, if desired, under superatmospheric pressure as in an autoclave. Sulfur dioxide is bubbled through the slurry for a major part, if not all, of the reaction period. Such bubbling of sulfur dioxide gas through the aqueous slurry at atmospheric pressure and room temperature results in the absorption of about 0.2 to about 0.6 unit of sulfur dioxide being absorbed per unit weight of the dry feed. The pressure maintained on the system is usually in the range of about 10 p. s. i. a. to about 50 p. s. i. a., with a pressure of about 15 p. s. i. a. preferred. Naturally the higher the system pressure maintained at any given temperature, the greater the quantity of sulfur dioxide in the slurry for the solubilizing reaction.

Use of superatmospheric pressure permits operation at higher temperatures and shortens the reaction time required to attain a given percentage of component dissolution. If elevated temperatures are used in connection with the elevated pressure, the slurry would be cooled to about room temperature prior to recovery of sulfur dioxide.

Dissolution of the desired minerals, uranium and phosphorus, is slightly enhanced by the presence of sulfuric acid in amounts giving between about 1% and about 5% acidulation calculated on the basis of the reaction of sulfuric acid with all of the iron, calcium, magnesium, and sodium present in the leached zone material. In other words, 100% acidulation would be the addition of that amount of sulfuric acid required to accomplish reaction with these components. This digestion reaction with a small amount of sulfuric acid is not to be confused with a straight acidulation reaction. For a specific set of conditions, namely of —200 mesh leached zone material calcined at 600° C., slurried in water to give a 30% solids slurry and digested with sulfur dioxide for four hours at room temperature, the dissolution accomplished in the presence of zero and 5% of sulfuric acid shows the following effect.

| Amount of Sulfuric Acid Added, Percent Acidulation | Percent Dissolution | |
| --- | --- | --- |
| | $U_3O_8$ | $P_2O_5$ |
| 0 | 87 | 77 |
| 5 | 93 | 81 |

Addition of sulfuric acid precipitates calcium sulfate, and additions in excess of the above may be used if complete calcium precipitation is desired.

The digestion reaction is carried out at a temperature in the range between about 20° C. and about 75° C., with a temperature of between about 25° C. and about 35° C. preferred. Temperatures significantly above 35° C. at atmospheric pressures decrease the quantity of sulfur dioxide solubles per unit of solution, and thereby normally decrease recoveries in solution. The effect of digestion temperature was determined by calcining —200 mesh leached zone material at approximately 700° C. for one hour, cooling the solids to room temperature, mixing the solids with water to produce a 30% solids content slurry, splitting the material into two portions and digesting the slurries by bubbling sulfur dioxide therethrough for two hours while maintaining the slurry temperature of one portion to approximately 25° C. while maintaining the other sample at 85° C. Results were as follows:

| Reaction Temperature, ° C. | Percent Dissolution From Leached Zone Feed | | | | |
| --- | --- | --- | --- | --- | --- |
| | $Al_2O_3$ | $P_2O_5$ | $U_3O_8$ | $CaO$ | $Fe_2O_3$ |
| 85 | 3.7 | 2.7 | 14.1 | 20.9 | 10.8 |
| 25 | 33.2 | 43.3 | 64.9 | 56.1 | 28.9 |

Digestion material from the sulfur dioxide-slurry reaction is mixed with additional water or an aqueous medium to form a relatively dilute slurry. The insoluble constituents are removed from the solution of soluble constituents by suitable separation apparatus, as, for example, by filtration. The solution or extract recovered will vary depending upon the feed material and the degree of reaction with sulfur dioxide. The composition of this filtrate may vary from one containing appreciable quantities of phosphoric acid to a solution which is predominantly monocalcium phosphate. The taking up in the aqueous medium of the soluble constituents is generally done in a stepwise multistage countercurrent leaching operation with the solid cake being repumped after each liquid-solids separation.

Recovery of uranium may be made either from the unfiltered dilute slurry or from the solution from which the insoluble constituents have been separated. Uranium is extracted from these feed materials by intimately contacting or agitating with an organic solvent having an affinity for uranium values. The temperature of the solution of organic solvent at the time of contact should not exceed about 55° C. and extraction is preferably carried out at temperatures between about 15° C. and about 30° C.

The organic solvent is generally made up of a minimum of two components, the effective extractant agent and a vehicle extender. The extractant agent may be one or more of the effective materials prepared by reaction of certain alcohols with phosphorus pentoxide such as to form phosphoric acid esters, i. e., esters of octanol-1, octanol-2, diisobutyl carbinol, isooctyl, hexyl, and other agents, said products having an affinity for uranium under the acidic process conditions. The extender or vehicle may be any one or more of the common organic fluids such as kerosene, benzene, naphtha, mineral spirits, carbon tetrachloride, trichlorethylene, and the like. Esters are limited only in that they must be miscible or partially miscible with the extractant agents used and substantially immiscible in the contacted aqueous material. To minimize organic losses, inasmuch as the organic phase is substantially immiscible in water, the aqueous raffinate before further processing is normally scrubbed with a suitable organic solvent to reduce the extractant or water content of the raffinate.

A concentration of extractant in the extender may vary widely, for example, between about 0.2% and about 100%, preferably between about 5% and about 10%. The volume ratios of aqueous extract phase to organic phase also may vary within wide limits, for example, between about 0.1:1 and about 50:1, preferably between about 5:1 and about 10:1. If the extraction is to be made directly from slurry, the two phases are contacted and separated centrifugally; whereas filtrate substantially free of solids would be contacted in multistage gravity separating countercurrent extractors of 3 to 10 stages. Useful equipment for the extraction operation are centrifugal separators, pulse and mixer columns, mixer settlers, and the like. Contact time has not been found to be a critical factor, so long as intimate and complete mixing is obtained. Multistage countercurrent uranium extraction using a processing time of about 1 to about 15 minutes per stage of extraction with 10% by volume solution of a phosphoric acid ester of octanol extended in kerosene will accomplish the removal of between about 90% and about 95% of the uranium values originally present in the extract when utilizing a 10:1 volume ratio of aqueous extract to organic solution.

The uranium rich organic solvent phase recovered from the extraction operation may be treated in any one of several methods to remove the uranium compounds. The rich organic solvent may be contacted, for example, with dilute sulfuric acid followed by dilute hydrofluoric acid. The sulfuric acid contact with the organic solvent removes calcium which would otherwise contaminate the uranium product. The organic solvent from sulfuric acid treatment is then contacted with hydrofluoric acid to precipitate uranium as uranium tetrafluoride. The organic solvent after removal of uranium is recycled for subsequent contact with uranium containing aqueous slurries. Normally the uranium rich organic phase is contacted with about 18% sulfuric acid at an aqueous to organic phase ratio of about 4. Upon separation of these phases, the sulfuric acid solution is filtered to remove gypsum and the acid recycled after addition of fresh sulfuric acid. The organic phase recovered from the sulfuric acid treatment is then contacted with a 15% hydrofluoric acid solution at an aqueous to organic phase ratio of about 1. Minimum contact between the two phases is preferred since the organic phase will degrade, with respect to subsequent uranium extraction, upon contact with the hydrofluoric acid solution. Room temperatures are used throughout the entire recovery circuit of treating the rich organic solvent. Upon separating the organic solvent-hydrofluoric acid phases, the organic solvent is recycled for subsequent $U_3O_8$ extraction and the aqueous phase filtered to remove a $UF_4$ precipitate normally assaying about 60% $U_3O_8$. The recovered hydrofluoric acid is recycled after fortifying with fresh hydrofluoric acid.

Aqueous raffinate from the uranium extraction operation may be treated to vaporize sulfur dioxide and free sulfurous acid or left in solution, as for example, for neutralization depending upon the subsequent processing. If recovery of sulfur dioxide for recycle to the reaction stage is desired, the extract solution is heated to a temperature at or near boiling, i. e., to a temperature in the range between about 80° C. and about 110° C. and held at that temperature for a period of between about 10 minutes to about 120 minutes.

Aqueous raffinate with or after sulfur dioxide removal is next treated to produce an agricultural phosphate. In the simplest form this consists of a drying operation.

The process of the instant invention is shown in simplified form in the attached drawing in which the numeral 10 indicates the source of raw material which is a mine where stripping operations remove the leached zone layer from the earth. Raw feed is moved by dry transportation means 11 such as a belt conveyor to the drying station 12. Dried ore is conveyed from drying station 12 to calcining station 17. In a by-pass operation material may be conveyed from drying station 12 to classification station 13. Oversized material from station 13 is discarded to waste, or is further processed to recover calcium phosphate values using conventional phosphate oredressing procedures. The undersized particle fraction from classification station 13 is conveyed to calcining station 17.

Alternatively, raw feed may be conveyed by wet transportation means 14, for example, as a slurry in a pipe line to a hydroclassification station 15. Oversized material from the hydroclassification station 15 is conveyed to waste. Undersized material from station 15 is flowed in slurry form to a dewatering or thickening station 16. Material accumulated at this station 16 is conveyed to the drying and calcining station 17.

From calcining station 17 heat treated material is conveyed to a cooling station 18. Cooled material is conveyed as by a belt conveyer to a reactor station 19. At reactor station 19 the cooled leached zone material is mixed with water or aqueous solution to produce a slurry. Sulfur dioxide gas from two sources is bubbled through the slurry in the reactor. The first source is sulfur dioxide conveyed through conduit 20 from a latter stage of processing as hereinafter described. The second source of sulfur dioxide is make-up gas entering the reactor through conduit 21, which delivers the gas from a suitable source not shown such as storage tanks or a sulfur burner. A conduit 22 is also provided to deliver sulfuric acid to reactor station 19.

From reactor station 19 reacted solids slurry is discharged through conduit 23 to leaching station 24. In leaching station 24 the slurry solids move in countercurrent flow to fluid which is introduced into the last countercurrent stage of the station as water. Insoluble material separated at station 24 is sent to waste. Solution issuing from station 24 containing the soluble constituents is delivered to extraction station 25. Alternatively, station 24 may be by-passed and slurry delivered directly to extraction station 25. In extraction station 25 the slurry or solution is intimately contacted with organic solvent. Enriched organic solvent separated in station 25 is conducted to stripping station 26 where the solvent is intimately contacted with aqueous medium. Uranium rich organic solvent is removed from station 25 and conducted to stripper 26 where it is contacted with an aqueous hydrofluoric acid solution. After intimate mixing and separation of the organic phase, the aqueous medium is conducted to a separation station 27 where precipitated uranium fluoride is recovered from the aqueous medium. Aqueous medium from station 27 is recirculated to station 26 through conduit 31, where make up hydrofluoric acid also is introduced through conduit 28. Separated organic solvent is recirculated to extraction station 25 through conduit 32.

Aqueous solution from extraction station 25 is delivered to a heat treatment station 29 where sulfur dioxide is vaporized and recycled to reactor station 19 through conduit 20. Heat treated solution is delivered from station 29 to drying station 30 where water is driven off and a dry agricultural phosphate is produced.

The invention will be more clearly understood from the following example, which is given by way of illustration and without any intention that the invention be limited thereto.

*Example*

300 pounds of −200 mesh size leached zone material was assayed and found to have the following analysis:

| | Percent |
|---|---|
| $Al_2O_3$ | 35.5 |
| $P_2O_5$ | 19.5 |
| $U_3O_8$ | 0.034 |
| CaO | 4.93 |
| $Fe_2O_3$ | 1.61 |
| SiO | 32.78 |

This 300 pounds of leached zone material was heat treated in a rotary kiln and held for one hour at a temperature of approximately 600° C. After heat treatment the leached zone material was cooled to room temperature of approximately 80° F. In the heat treatment there was a loss of approximately 15.5% of the weight. Cooled solids were mixed with 700 pounds of water. The slurry was pumped to an autoclave at a temperature of about 75° F. Sulfur dioxide was bubbled through the slurry for four hours during which time the slurry remained at approximately 75° C. and atmospheric pressure. Approximately 94 pounds of sulfur dioxide was absorbed by the slurry during the four hour reaction period. At the end of four hours, 15.6 pounds of 96% sulfuric acid was added and the reaction continued for one-half hour. Approximately 62 pounds of sulfur dioxide were volatilized upon addition of sulfuric acid.

At the end of the reaction the resultant slurry was given a 10 minute contact period with organic solvent at a phase ratio of 4 volumes of slurry for each volume of organic solvent. The organic solvent consisted of a 10% solution of the phosphoric acid ester of tridecyl alcohol extended in kerosene. The phases were separated by means of a centrifuge. Separated organic solvent was contacted with an aqueous solution of 15% hydrofluoric acid and 0.8 pound $U_3O_8$ content cake as $UF_4$ precipitate recovered. The resulting wet cake after water washing had a weight of approximately 214.7 pounds. This cake assayed on a wet cake basis:

| | Percent |
|---|---|
| $Al_2O_3$ | 13.37 |
| $P_2O_5$ | 5.9 |
| $U_3O_8$ | 0.0046 |
| CaO | 0.81 |
| $Fe_2O_3$ | 0.68 |
| $SO_2$ | 0.07 |
| $SO_4$ | 0.64 |

Indicated dissolutions were:

| | Percent |
|---|---|
| $Al_2O_3$ | 46 |
| $P_2O_5$ | 57 |
| $U_3O_8$ | 79 |
| CaO | 74 |
| $Fe_2O_3$ | 40 |

The filtrate recovered from the aqueous raffinate constituted approximately 100 gallons of solution analyzing:

| | Grams/liter |
|---|---|
| $Al_2O_3$ | 40.4 |
| $P_2O_5$ | 37.5 |
| $U_3O_8$ | 0.09 |
| CaO | 9.1 |
| $Fe_2O_3$ | 1.9 |
| $SO_2$ | 76.0 |
| $SO_4$ | 16.58 |

Upon heating this liquor to a temperature of approximately 100° C. and holding at this temperature for about 30 minutes, the $P_2O_5/SO_2$ weight ratio was increased from 0.154 to 0.495 and the $P_2O_5/SO_4$ weight ratio from 2.25 to 0.78. This indicated a vaporization of 95%+ of the sulfur dioxide. Approximately 5 minutes after heating a gelatinous formation occurred. Upon drying 51.05 pounds of the gelatinous material at 110° C., 9.7 pounds of product was obtained. This material assayed 22.7% $P_2O_5$.

Having thus described my invention what I claim is:

1. A process for water-solubilizing and recovering uranium values contained in leached zone material from Florida pebble phosphate overburden which comprises heat treating the leached zone material at a temperature above about 500° C. and below about 1000° C., reacting the heat-treated material in aqueous slurry with sulfur dioxide, whereby the uranium values are rendered water-soluble, diluting the treated slurry with an inert aqueous medium, whereby the uranium values are dissolved in the aqueous phase, and recovering the uranium values from said aqueous phase.

2. A process as in claim 1 wherein the heat treatment of said leached zone material is carried out at a temperature between about 500 and about 700° C. for a period of about 1 to about 6 hours.

3. A process as in claim 1 wherein said leached zone material has a particle size smaller than about 150 mesh at the time of said heat treatment.

4. A process as in claim 1 wherein the reaction of said heat-treated material with sulfur dioxide is carried out at a temperature between about 25 and about 80° C. for a period of about 2 to about 6 hours.

5. A process as in claim 1 wherein the uranium values are extracted from said aqueous phase with an acidic alkyl phosphoric acid ester.

6. A process as in claim 5 wherein said ester is a phosphoric acid ester of tridecyl alcohol.

7. A process as in claim 1 wherein insoluble material is separated from the diluted slurry before recovery of uranium values from the aqueous phase.

References Cited in the file of this patent

UNITED STATES PATENTS

| | | |
|---|---|---|
| 1,095,377 | Burfiend | May 5, 1914 |
| 2,227,833 | Hixson et al. | Jan. 7, 1941 |
| 2,405,426 | Hitchon et al. | Aug. 6, 1946 |
| 2,767,045 | McCullough | Oct. 16, 1956 |

OTHER REFERENCES

Warf: U. S. Atomic Energy Commission declassified paper No. AECD–2524, Aug. 7, 1947, 10 pages.

AEC declassified paper RMO–2708, Utilization of Florida Leach Zone Material, November 1952, available as a micro card from AEC.